United States Patent [19]

Lammers et al.

[11] 4,297,712

[45] Oct. 27, 1981

[54] AIR FLOW TUNNEL FOR REDUCING INK JET DRAG ON ARRAY HEAD

[75] Inventors: Gerald B. Lammers, Boulder; Gordon J. Smith, Longmont, both of Colo.

[73] Assignee: International Business Machines Corporation, Armonk, N.Y.

[21] Appl. No.: 76,093

[22] Filed: Sep. 17, 1979

[51] Int. Cl.[3] .............................................. G01D 15/18

[52] U.S. Cl. .................................. 346/75; 346/140 R

[58] Field of Search .......................... 346/1, 75, 140 R

[56] References Cited

U.S. PATENT DOCUMENTS

| | | | |
|---|---|---|---|
| 2,577,894 | 12/1951 | Jacob | 346/75 |
| 3,596,275 | 7/1971 | Sweet | 346/75 X |
| 3,972,051 | 7/1976 | Lundquist et al. | 346/75 X |
| 4,002,230 | 1/1977 | Schweppe et al. | 197/1 R |
| 4,031,561 | 6/1977 | Paranjpe | 346/1 |
| 4,097,872 | 6/1978 | Giordano et al. | 346/75 |
| 4,106,032 | 8/1978 | Miura et al. | 346/140 R |

*Primary Examiner*—George H. Miller, Jr.
*Attorney, Agent, or Firm*—Joscelyn G. Cockburn

[57] ABSTRACT

Disclosed is a droplet aspirator suitable for use with a multinozzle ink jet printer. The aspirator includes a housing with a flow channel therein. The flow channel includes an exit section having a substantially planar geometry with a constant cross-sectional area extending from a point where ink droplets are ejected into the channel to a point where the droplets exit said channel, an entry section having a relatively large cross-sectional area and an intermediate section with reduced cross-sectional area interconnecting the entry section with the exit section.

13 Claims, 5 Drawing Figures

AIR FLOW TUNNEL FOR REDUCING INK JET DRAG ON ARRAY HEAD

BACKGROUND OF THE INVENTION

1. Field of the Invention

The present invention relates to ink jet printers. Particularly, the invention relates to the control of ink droplets to ensure proper registration on a recording medium.

2. Prior Art

The use of ink jet printers for printing data and other information on a strip of recording media is well known in the prior art. Conventional ink jet printers incorporate a plurality of electrical components and fluidic components. The components coact to enable the printing function. The fluidic components include a print head having a chamber for storing a printing fluid or ink and a nozzle plate with one or more ink nozzles interconnected to the chamber. A gutter assembly is positioned downstream from the nozzle plate in the flight path of ink droplets. The gutter assembly catches ink droplets which are not needed for printing on the recording medium.

In order to create the ink droplets, a drop generator is associated with the print head. The drop generator vibrates the head at a frequency which forces the thread-like streams of ink, which are initially ejected from the nozzles, to be broken up into a series of ink droplets at a point within the vicinity of the nozzle plate. A charge electrode is positioned along the flight path of the ink droplets. The function of the charge electrode is to selectively charge the ink droplets as said droplets pass said electrodes. A pair of deflection plates is positioned downstream from the charge electrodes. The function of the deflection plates is to deflect a charged ink droplet either into the gutter or onto the recording media.

One of the problems associated with ink jet printers of the aforementioned type is that of ink droplets misregistration at the recording surface. The ink droplets misregistration arises from interaction between the droplets as said droplets are propelled along a flight path towards the recording surface. The causes for droplets interaction are usually twofold, namely: the aerodynamic drag on the respective droplets and the electrical interaction between the electrical charges which are placed on the ink droplets.

The aerodynamic interaction and the electrical interaction are closely related. In fact, the aerodynamic interaction and the electrical interaction are complementary and are usually never observed independently. As ink droplets are generated at the nozzle plate, the charge electrode deposits a certain quantum of electrical charge on the droplets. Depending on the polarity of the charge, the droplets either repel or attract one another. The electrical forces which attract and/or repel the ink droplets tend to affect the relative spacing between the droplets. As such, some droplets arrive at the recording media early while others arrive late. In some situations, the droplets arrive at the recording media in groups rather than individual drops. The net result is that the copy quality is relatively poor due to droplet misplacement on the media.

The aerodynamic interaction also tends to affect the relative spacing between droplets. Spacing is affected because the aerodynamic interaction either increases or decreases the velocity of the droplets. As a result, some ink droplets are reaching the media early while others are reaching the media late. The overall effect is that the presence of the aerodynamic interaction also called the aerodynamic drag, aggravate or magnify the effect of the charge interaction.

In order to effectively solve droplets registration problems, both the charge interaction and the aerodynamic interaction have to be addressed. The prior art uses the so-called guard drop method to solve the charge interaction problem. In this method nonadjacent droplets are charged. Stated another way, charged droplets are separated by a predetermined number of noncharged droplets.

In addressing the aerodynamic interaction problem, the prior art utilizes a gas stream, such as air, to compensate for the aerodynamic drag on the ink droplets. U.S. Pat. No. 3,596,275 is an example of the prior art method. In that patent a stream of air is introduced into the droplet flight path. The air flows collinearly, with the stream of ink droplets and reduce the aerodynamic effect. In order to maintain laminar air flow beginning at the point where the droplets are interjected into the air stream or vice versa, the nozzle is mounted in the center of the air stream. The charging electrode is fabricated in the shape of a hollow streamline strut. The strut is fitted with an opening through which ink droplets are ejected. The strut surrounds the nozzle with its opening and stream line contour position in the direction of air flow. Although this approach appears to be a step in the right direction, one of the main problems is that the air flow is not fully laminar (that is, free from turbulence). Turbulent air flow tends to blow the minute droplets from their normal trajectory and, therefore, the misregistration phenomenon is not completely solved. In fact, turbulent air flow may well aggravate the misrepresentation problem.

Another problem with the above-described patent is that its teaching and apparatus is only effective with a single nozzle head. When a head having a relatively large number of nozzles (that is, a multinozzle head) is used, it would be impractical to build a strut to surround such a head.

U.S. Pat. No. 4,097,872 is another prior art example of an aspirator where a fluid such as air is used to correct for aerodynamic interaction or aerodynamic drag. The aspirator includes a housing having a tunnel therein. The tunnel is spaced from an ink jet nozzle which emits an ink stream which passes through the tunnel. The tunnel is characterized by a circular geometry with a settling chamber section and a flow section. Air turbulence is removed at the settling chamber. Although the teaching in the subject patent works well for its intended purpose and is a significant improvement over the prior art, it suffers from one drawback.

The primary drawback is with the circular geometry, the velocity profile across the tunnel is not constant. Of course, the velocity at the center of the tunnel is constant. Therefore, with a single nozzle head positioned to eject ink in the center of the tunnel, the droplets will experience constant velocity. However, with a multinozzle head, the velocity across the streams will not be constant. Therefore, streams ejected into the tunnel would experience variable velocity. Stated another way, due to the nonuniform velocity profile across the channel, the disclosed device is not suitable for use with a multinozzle head.

SUMMARY OF THE INVENTION

It is, therefore, the object of the present invention to provide a more efficient and effective ink jet aspirator than has heretofore been possible.

It is another object of the present invention to provide an integrated ink jet aspirator adapted for use with a multinozzle ink jet head.

The ink jet aspirator includes a housing with a channel or tunnel therein. The channel is characterized by three distinct concatenated sections. The first section has a relatively large cross-sectional area and acts as a settling tank or settling reservoir to remove turbulence in the incoming air. The second section is contiguous to the first section but with a reduced cross-sectional area in the direction of air flow. The reduced cross-sectional area increases the velocity of the air and reduces any residual turbulence in the air. The third section is contiguous to the second section with a constant cross-sectional area over its entire length. The constant cross-sectional area maintains a uniform velocity profile across the channel. The aspirator is integrated with a multinozzle head so that ink is ejected into the third section of the aspirator.

In one embodiment of the invention, the settling tank is fitted with a pair of porous screens. The screens help to remove turbulence in the incoming air.

In another embodiment of the invention, the third section of the aspirator has a planar geometry preferably rectangular or elliptical.

The foregoing and other features and advantages of the invention will be apparent from the following more particular description of the preferred embodiment of the invention, as illustrated in the accompanying drawings.

DESCRIPTION OF THE PREFERRED EMBODIMENT

As is used in this application, an ink jet aspirator is a device which produces a laminated collinear air flow with one or more ink jet streams for reducing the effects of aerodynamic retardation on the streams. The aspirator is useful in all types of ink jet printing systems.

Figure 1:
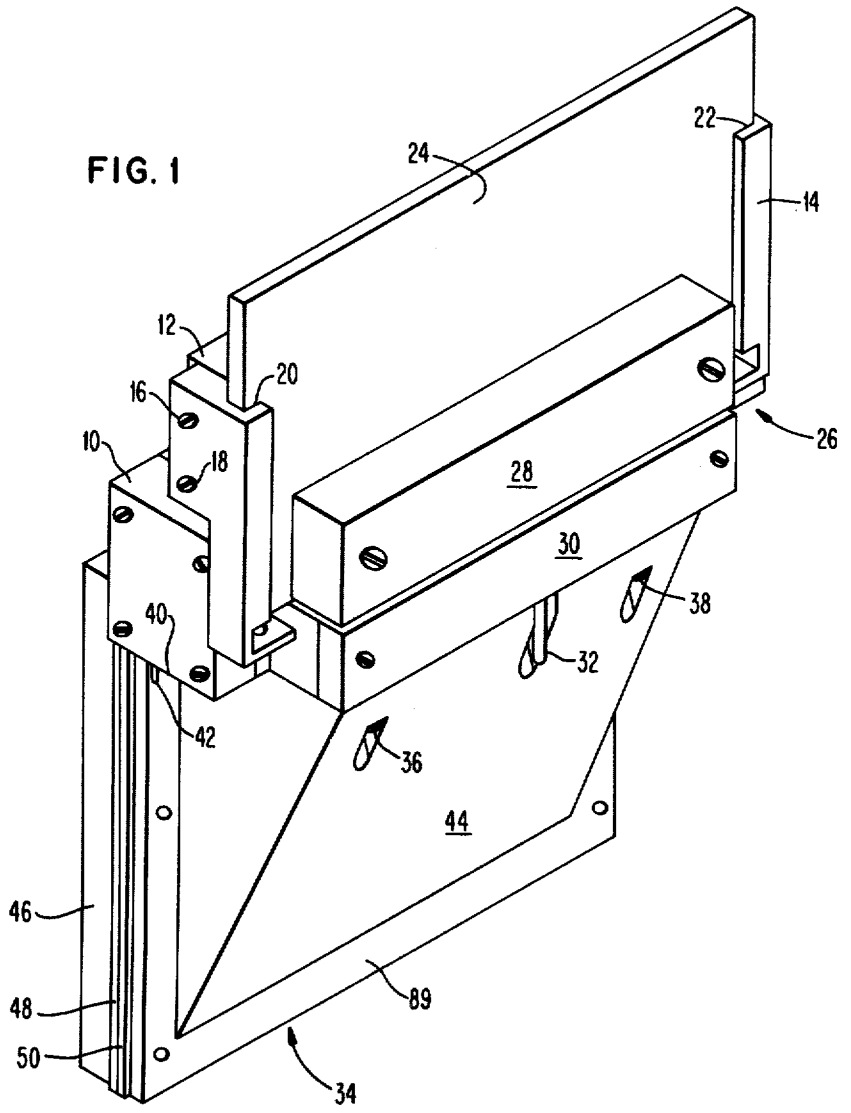
FIG. 1 shows a pictorial view of the aspirator and a multinozzle ink jet head according to the teachings of the present invention.

FIG. 1 shows a pictorial view of an integrated ink jet aspirator. The integrated ink jet aspirator includes an aspirator and an ink jet head 10. As will be explained hereinafter, the ink jet head 10 includes a cavity or reservoir for carrying a printing fluid such as ink. A vibrating crystal is mounted in the ink. A nozzle wafer of membrane carrying a multiplicity of minute apertures is mounted on the surface of the head. A connecting channel joins the ink reservoir with the plurality of apertures in the nozzle wafer. When pressure is applied to the fluid and an electrical signal is applied to the crystal, the crystal vibrates and sets up a pressure differential between the reservoir and the nozzles. As such, thread-like streams of ink emits from the plurality of apertures. As the ink reaches a certain point downstream from the nozzles, the ink is broken up into a plurality of individual ink droplets. The ink droplets usually have a diameter on the order of 0.002 inches and have a drop velocity on the order of 700 inch/second. The operation of multinozzle ink jet head and the generation of droplets are well known in the prior art and therefore will not be described in greater detail. Suffice it to say that the ink droplets are selectively charged and selectively deflected into a gutter assembly or onto a recording surface.

Still referring to FIG. 1, a support structure 12 is mounted to one surface of the ink jet head. A charge electrode holder 14 is connected to the support structure 12. In the preferred embodiment of the invention, the charge electrode holder is connected to the support structure 12 by a plurality of screws, only two of which are shown in the figure and identified as screws 16 and 18. The charge electrode holder 14 is fitted with grooves 20 and 22 respectively. A charge electrode structure 24 is fitted into the grooves. The lower surface of the charge electrode assembly 24 includes a plurality of charge electrode and is positioned so that ink droplets emanating from the multinozzle head can be selectively charged when a voltage is applied to the charge electrode structure. A combined deflection electrode gutter assembly 26 is positioned downstream from the charge electrode structure. As will be explained subsequently, the combined deflection electrode gutter assembly 26 includes an upper deflection plate holder 28 and a lower deflection plate 30. An upper deflection plate (not shown) is fitted in the upper deflection plate holder. The upper and lower deflection plates are arranged so that a spacing or channel is defined therebetween.

Ink droplets for writing on a medium (not shown) is propelled through the channel. A laminar flow of air is introduced into the channel and flow collinearly with the ink droplets. As will be explained subsequently, the gutter assembly is integrated with the lower deflection plate 30. Ink is transported from the gutter assembly through a conduit 32 to an ink recirculating reservoir (not shown). An air tunnel assembly 34 is mounted by mounting screws 36 and 38 respectively, to the lower deflection plate. The lower surface 40 of the ink jet head 10 sits on the upper surface of the wind tunnel assembly 34. As such, the wind tunnel assembly gives structural support to the head. As was stated previously, the air tunnel assembly 34 is fitted with a tunnel or channel (not shown) through which a fluid such as air is processed and is channeled to flow collinear with ink droplets emanating from the ink jet head to print on a media. In the preferred embodiment of the present invention the air tunnel assembly 34 is manufactured from Plexiglass with the air tunnel fabricated into said Plexiglass. The air tunnel assembly 34 includes a triangular shape housing member 44 with an integral rectangular flange 89 about its periphery. The rectangular flange is connected to a rectangular cap member 46 by a plurality of mounting screws. An air flow tunnel (not shown) is fabricated inside the triangular shaped housing member and the cap member. The tunnel includes a rectangular section having a rectangular cavity with a relatively large area followed by a section which has a cavity of reducing cross-sectional areas. The reduction occurs in two dimension only so that the exit port from air tunnel 34 is in the form of a slit. The rectangular cavity is formed by removing material from the central portion of cap member 46 to form a rectangular cavity therein. As will be explained subsequently, as air is introduced into the rectangular section of the air tunnel assembly, the air is distributed over a relatively large area. The distribution tends to remove turbulence in the airstream. In removing the turbulence, the velocity of the airstream tends to be reduced, and by forcing the airstream through a tunnel section having a reduced cross-sectional area, the velocity of the wind is again increased. The reducing cross-sectional area also tends to further remove turbulence in the air.

A pair of screens 48 and 50 respectively are mounted between the cap member 46 and the triangular housing member 44. The screens can be fabricated from a wire having fine mesh or a felt material. The screen acts as a gasket between the two sections and also functions to reduce turbulence in the incoming area. It should be noted that the processed air which flows from the exit slit of air tunnel 44 and into the ink droplets flight path is laminar (that is, free from turbulence).

Figure 2:
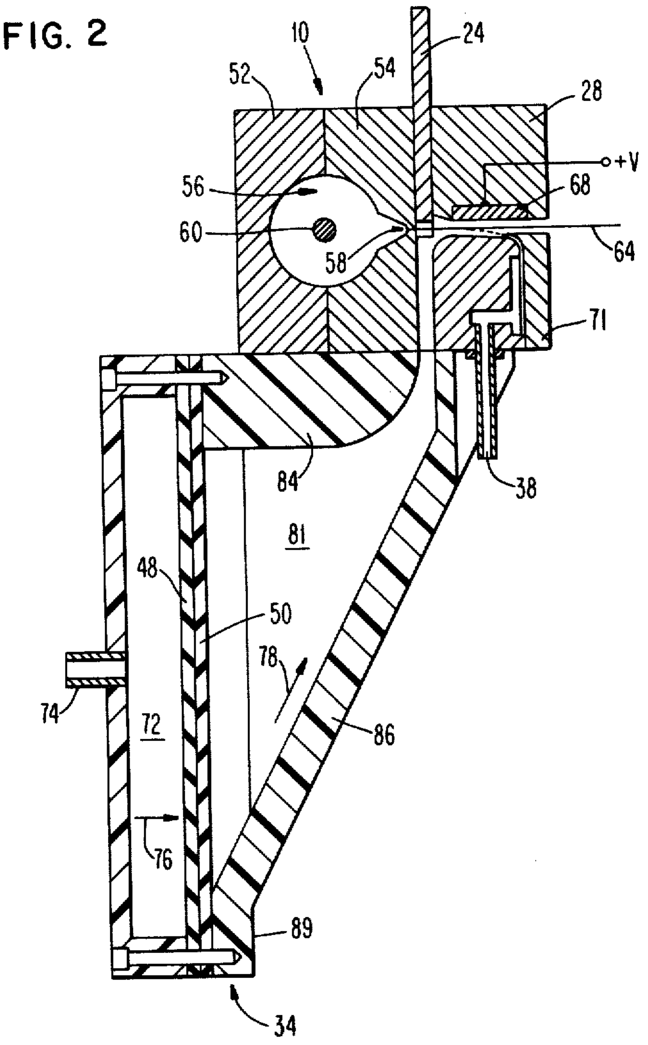
FIGS. 2 and 2A show a cross section view of the integrated aspirator and multinozzle ink jet head according to the teaching of the present invention.
Figure 2A:
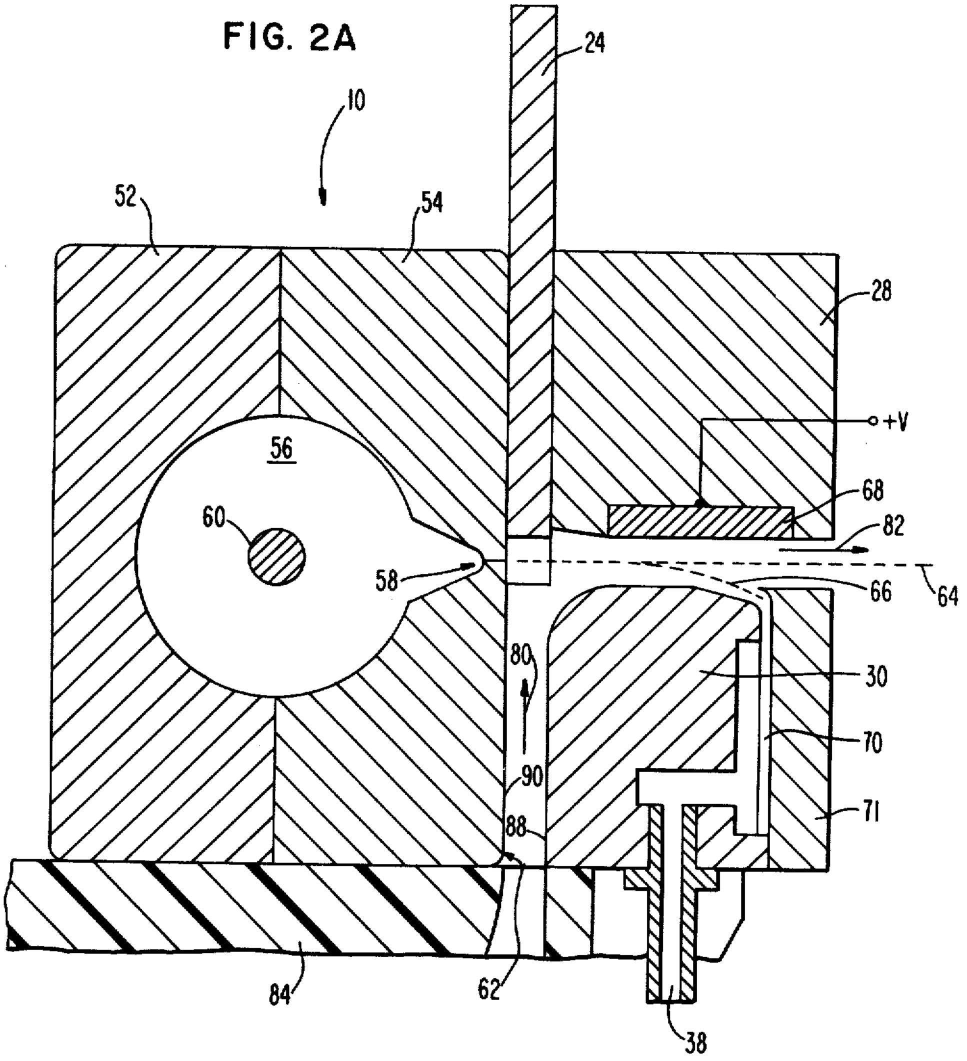

Referring now to FIGS. 2 and 2A, a cross section of the integrated aspirator ink jet head is shown. For consistency, elements in FIGS. 2 and 2A, which are common with previously identified elements, will be given the same numeral. The ink jet head 10 is fabricated from elongated rectangular housing halves 52 and 54 respectively. An ink reservoir 56 is fabricated in the housing halves. As was stated previously, the ink reservoir 56 contains ink which is used for writing on a recording media. The ink reservoir has its length extending perpendicular to the page. In other words, the reservoir is also elongated. A focusing channel 58 is fabricated in the ink reservoir.

An elongated piezoelectric crystal 60 is mounted internal to the ink reservoir. As was stated previously, when the electric crystal vibrates, a plurality of thread-like ink streams are emitted from a plurality of tiny orifices mounted to housing half 54 and in alignment with the focusing channel 58. As the thread-like streams reach a point downstream from surface 62 of the ink jet head, the streams are broken up into a plurality of minute ink droplets. The droplets are propelled along ink droplet path such as 64 to write on a recording medium (not shown). Droplets which are not needed for writing on the recording medium are deflected along deflection path 66 into the gutter assembly. Ink is removed from the gutter assembly through conduit 38. It should be noted that the structure described in this invention is a multinozzle ink jet head. As such, a plurality of droplets flight paths such as droplets flight path 64 and a plurality of deflection paths such as deflection path 66 are arranged along a line perpendicular to the page.

Still referring to FIGS. 2 and 2A, charge electrode assembly 24 is positioned downstream from the head 10. As ink droplets are formed downstream from the head, drops which are designated for the gutter are charged while drops for writing on the media are not charged. The upper deflection plate 68 and the lower deflection plate 30 are arranged to form a flow channel, hereinafter identifed as the third section of the air tunnel. The third section of the air tunnel has a planar cross-sectional area preferably rectangular or eliptical. The rectangular or eliptical geometry extends from the point where ink droplets are interjected into said channel to the point where ink droplets exit the channel for writing on a media.

By having a planar geometry from the point where ink droplets are ejected into the channel, the channel is able to contain a multinozzle head ejecting ink droplets from a plurality of nozzles. Also, with the planar cross-sectional area, the velocity profile of the air is uniform throughout the tunnel. Although there is a plurality of ways of mounting the upper deflection plate 68 and the lower deflection plate 30 in the preferred embodiment of this invention, the upper deflection plate 68 is a metal bar mounted into an upper deflection plate holder 28. Means are provided for supplying positive voltage to the plate.

Still referring to FIGS. 2 and 2A, the lower deflection plate 30 is a unified structure which also includes the gutter assembly. In the preferred embodiment of the invention, the lower deflection plate 30 is fabricated from stainless steel. A groove 70 is formed in the lower deflection plate 30. A catcher member 71 with a thin edge is mounted to the lower deflection plate, with the thin edge positioned to capture drops traveling along the deflection path 66 into groove 70. When vacuum is applied to conduit 38, ink accumulating in the groove is removed from the gutter assembly. The upper surface of the lower deflection plate 30 which forms the air channel is rounded so that as air is introduced into the channel, the rounded corners will not create any turbulence in the air.

Still referring to FIGS. 2 and 2A, the air tunnel assembly 34 includes a flow cavity suitable for containing a fluid such as air. The flow cavity includes a first section referred to as settling reservoir 72. The settling reservoir has a substantially rectangular cross-sectional geometry. The corners of the settling reservoir may be rounded if desired. The rounding of corners would further inhibit the development of turbulence in the chamber. The chamber has a relatively wide surface area so that turbulent air which enters through conduit 74 is relieved of the turbulence by virtue of distribution over a relatively wide area. Air flow along the aspirator is in the direction of arrows 76, 78, 80 and 82 respectively. Air leaving the settling chamber in the direction of air flow is forced through screen members 48 and 50 respectively. The screen members further reduce any turbulence in the air. The second section of the wind tunnel 81 is coupled through the screen members to settling chamber 72. It should be noted that the second section 81 of the channel has a reducing cross-sectional area in two dimensions only. The reduction decreases from the screen 50 towards the third section of the air tunnel. The third section of the air tunnel extends from the nozzle plate to a point from which ink droplets exit to write on a medium. Although not obvious from FIG. 2 the dimension of the second section 81 which is not reduced, is along a plane perpendicular or running parallel to the length of the multinozzle head. The constant reduction in the second section 81 of the tunnel tends to further reduce any residual turbulence in the air and create a laminar flow and also speed up the velocity of the air. Although there is a plurality of ways in which the tunnel section 80 can be diminished in the preferred embodiment of the present invention, it is diminished by placing and inserting member 84 in the housing of the air tunnel assembly. The surface of the insert which faces the tunnel is rounded so as air passes over said surface there is no sharp corners to create turbulence. The area of the tunnel is diminished in the second dimension by fashioning side 86 of the housing at an angle with respect to screen member 50.

As is evident from FIG. 2, the air tunnel includes basically three sections. Air which enters through conduit 74 passes into settling tank 72. The settling tank or reservoir 72 forms the first section of the aspirator tunnel. In this section turbulence is removed. Air exit settling tank 72 through screen members 48 and 50 respectively, enter the second section of the wind tunnel. The second section identified as section 80 has a reducing cross-sectional area extending from the screen member 50 up to the vicinity of the charge electrode assembly 24. The second section 81 operates to remove any residual turbulence in the air and also to increase the velocity of the air. The third section of the aspirator flow tunnel forms the horizontal portion which extends from the vicinity of the charge electrode 24 to the point where the droplets exit. This section of the flow channel has a constant cross-sectional area with a planar geometry preferably eliptical or rectangular. As such, the planar geometry will contain all the nozzles of a multinozzle head. Also as air enters the third section of the flow channel, the air is already processed and all turbulence is removed. The air velocity in the third section is substantially equivalent to the velocity of the ink droplets ejected therein from the ink jet head. The third section of the flow channel is arranged collinearly with the nozzles on the ink jet head. As such, droplets which are ejected into the channel experience a constant velocity due to the air therein and aerodynamic drag is removed. It should be noted that the vertical section of wind channel is formed by surfaces 88 and 90 of the lower deflection plate 30 and housing half 54 of the ink jet head. As such, the aspirator is completely integrated with the ink jet head.

Figure 3:
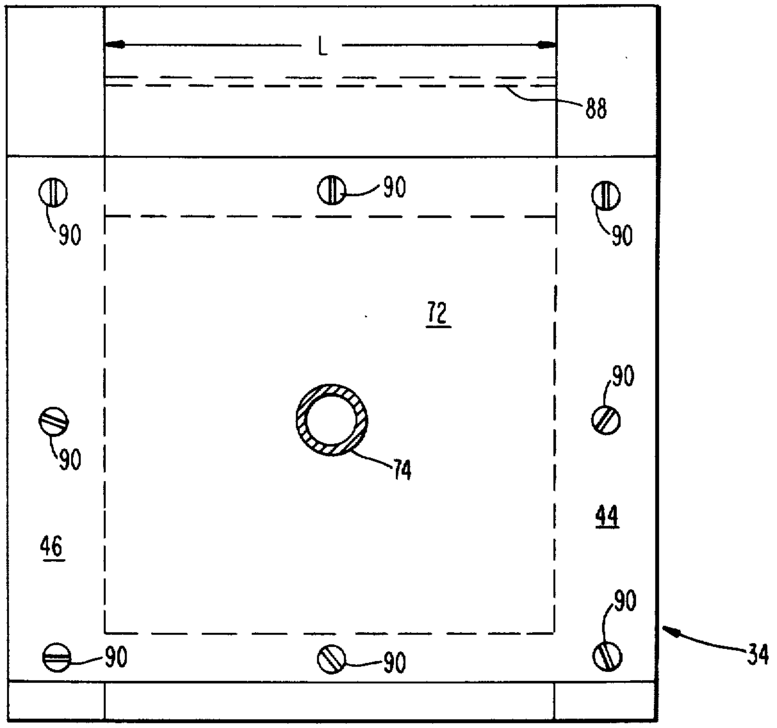
FIG. 3 is a rear view of the airflow tunnel assembly. The view is helpful in understanding the change in geometry of the air flow tunnel between the settling tank and its exit.

Referring now to FIG. 3, a rear view of the air flow tunnel assembly 34 is shown. The view is helpful in understanding the geometric relationship between the settling chamber 72 and the elongated planar slit 88 through which the air exits the wind tunnel assembly 34. With reference to FIG. 2, air flowing through slit 88 into the third section of the aspirator channel flows through the vertical section of the flow channel formed between surfaces 90 and 88 respectively (FIG. 2). As is evident in FIG. 3, rectangular housing member 46 is attached to rectangular sleeve 89 (FIG. 1) of triangular housing member 44 by a plurality of screws 90. The rectangular shape settling tank 72 is enclosed in the broken lines. Air enters the tank through conduit 74 from a pressurized source (not shown). The settling tank 72 is interconnected to slit 88 by a interconnecting channel (that is, the second section of the flow channel) which has a decreasing cross-sectional area in two dimensions only from the settling tank towards slit 88. In FIG. 2 the side view of slit 88 is shown. As is evident from FIG. 3, one dimension of the settling tank is maintained as the second section is diminishing in two dimensions. The dimension L which is not reduced is at least equivalent to the width or length of the multinozzle head. In the preferred embodiment of the present invention: $L = \text{Array Length} + 2\lambda$ where $\lambda$ is approximately ten to twenty times the height of the channel. In the expression for L, the $2\lambda$ is symmetrical with respect to the first array nozzle and the last array nozzle, respectively. Stated another way, the linear distance from the first nozzle of the array to the side wall of the channel is approximately equivalent to $\lambda$. Similarly, the linear distance from the last nozzle of the array to the side wall of the channel is approximately equivalent to $\lambda$.

Figure 4:
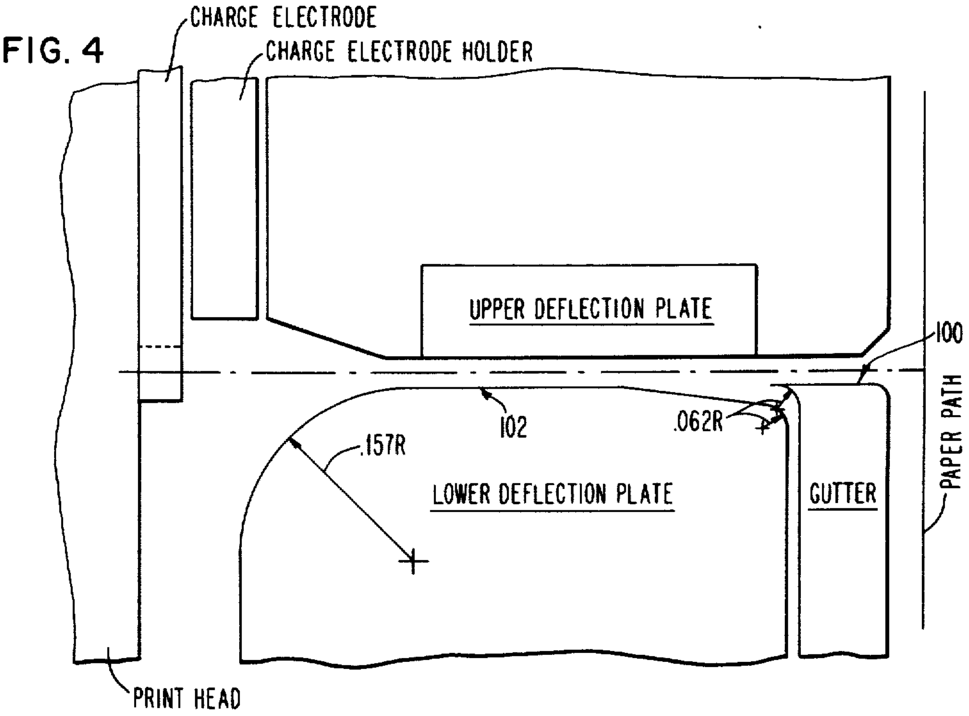
FIG. 4 shows a schematic view of an ink jet printer. The view is helpful in understanding the internal geometry of the flow tunnel.

FIG. 4 shows a schematic view of the third section of the flow channel and a partial view of the second section of the flow channel. The components which are essential to the proper operation of an ink jet head are identified by name in the drawings. The schematic is useful in understanding the internal geometry of the channel. Although the schematic shows the various components arranged so that air can escape from the channel in the actual device, the components are closely arranged with respect to one another to form a hermetically sealed structure. If necessary, all crevices are sealed with a potting compound, foam or any other suitable means. Particularly, all edges or corners are rounded or slanted so that turbulence in the air flow is minimized. The schematic also shows examples of the radius of curvature and the angles of slant used to fabricate the flow channel. Of particular interest is the fact that surface 100 of the gutter assembly is on the same level or plane with surface 102 of the lower deflection plate. However, there is a slight slant in the surface of the lower deflection plate which adjoins the gutter. The slant allows ink droplets traveling along the deflection path to be captured in the gutter. In the preferred embodiment of the present invention, the surface of the lower deflection plates slant at an an angle of approximately 6° with respect to the horizontal line. It should be clearly understood that the showing in FIG. 4 is only exemplary. It is not intended for the numbers to limit the scope of the present invention. Artisans who are skilled in this art can easily change the curvature slant etc. without departing from the scope of the present invention.

What is claimed is:

1. An integrated ink jet aspirator comprising:

a housing means having an air inlet port, an interconnecting flow channel and an outlet port;

said interconnecting flow channel includes a first section operable to reduce turbulence in a stream of incoming air, a second section being coupled to the first section and operable to increase the velocity of the incoming air; a third section being coupled to the second section said third section having a non-circular cross section with a constant geometry along its longitudinal axis and operable to maintain a constant velocity in the incoming air; and an ink jet head positioned relative to the housing means and in linear alignment with the third section whereby ink droplets emanating from the ink jet head are being propelled into a nonturbulent uniform velocity air flow.

2. The ink jet aspirator of claim 1 further including a charge electrode means positioned relative to the ink jet head and operable to charge droplets emanating therefrom.

3. A droplet aspirator for use with a multinozzle ink jet head comprising:

a first channel section, with an opening therein, having a planar geometry with a constant cross-sectional area extending from the ink jet head towards a recording surface;

a charge electrode means positioned downstream from the ink jet head;

a deflection means associated with the first channel section, positioned downstream from the charge electrode;

a gutter means positioned downstream from the deflection means; and a second channel section contiguous with the first channel section; said second channel section having a first decreasing cross-sectional area followed by an increasing cross-sectional area.

4. The droplet aspirator of claim 3 further including an inlet port coupled to the second channel section.

5. The droplet aspirator of claim 3 wherein the first channel section has an elliptical geometry.

6. The droplet aspirator of claim 3 wherein the first channel section has a rectangular geometry.

7. The droplet aspirator of claim 3 further including a multinozzle ink jet head; said head being positioned so that the multinozzles are in spaced linear alignment with the entrance opening to the first channel section.

8. An integral ink jet aspirator comprising:

a multinozzle ink jet head operable to generate a plurality of droplet streams;

a housing means coupled to the multinozzle ink jet head; said housing means having a tunnel therein, said tunnel being characterized by a settling reservoir and a section with decreasing cross-sectional area disposed traversely to the droplet streams;

a lower deflection plate coupled to the housing means and positioned relative to the multinozzle ink jet head;

an upper deflection plate holder disposed in spaced alignment to the lower deflection plate; said upper deflection plate holder having an upper deflection plate mounted on its center in spaced alignment with the lower deflection plate and defining a channel therebetween; said channel being collinearly aligned with the plurality of nozzles; and a gutter assembly operably associated with the lower deflection plate.

9. The ink jet aspirator of claim 8 further including a charge electrode positioned relative to the multinozzle ink jet head and operable to charge ink droplets emanating from said nozzles.

10. The ink jet aspirator of claim 8 further including means for supplying a pressurized air to the settling reservoir.

11. An air tunnel assembly for use with an aspirated ink jet head comprising:

a housing means with an air tunnel therein; said air tunnel having a settling chamber having a relatively large cross-sectional area for removing turbulence in incoming air, a velocity controlled section interconnected to the settling chamber and having a decreasing cross-sectional area extending from the settling chamber to an exit port, a planar section having an ellipsoidal or rectangular cross-sectional area coupled to the exit port; and an inlet port for supplying air to the settling chamber.

12. The air tunnel assembly of claim 11 further including mesh means associated with the settling chamber and operable to reduce turbulence in the incoming air.

13. The air tunnel assembly of claim 11 further including a deflection means operably associated with said housing means; said deflection means having a flow channel therein and an integral ink catching gutter assembly.

* * * * *